July 10, 1928.
E. S. TRUE
ELECTRICAL CONDENSER
Filed Aug. 9, 1923
1,676,417
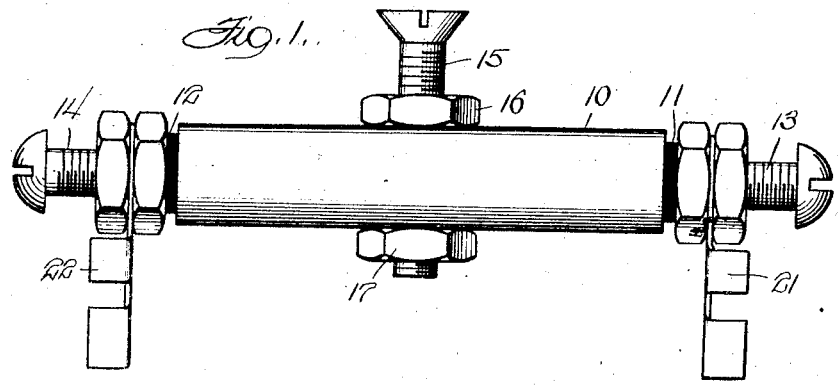
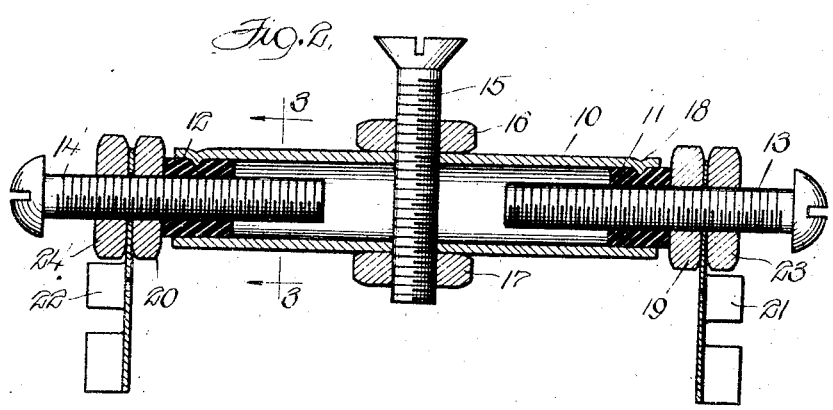
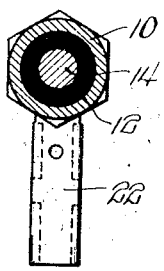
Inventor:
Edwin S. True
By Jones, Addington, Ames & Seibold
Attys.

Patented July 10, 1928.

1,676,417

UNITED STATES PATENT OFFICE.

EDWIN S. TRUE, OF OAK PARK, ILLINOIS.

ELECTRICAL CONDENSER.

Application filed August 9, 1923. Serial No. 656,494.

This invention relates to devices for providing electrical capacity and more particularly to such devices in the form of condensers of relatively small capacity and capable of very accurate adjustment.

One object of this invention is to provide a condenser, the capacity of which may be easily and quickly adjusted and adjusted with extreme accuracy.

A further aim of this invention is to provide a condenser of simple construction which may be used either as a single condenser in series with any desired circuit, or which may be effective as a pair of condensers connected in parallel, each of the parallel condensers being independently and very accurately adjustable.

A further object of this invention is to provide a condenser which will be durable and efficient in use, easy to operate and simple in construction. Furthermore, the condenser herein described may be constructed largely of parts comprising screws, nuts, and tubing which may be of commercially standardized sizes and consequently, easily obtainable in quantities at a low price.

Further objects will appear from the detailed description following and from the appended claims.

In the drawings, in which an embodiment of my invention is shown—

Figure 1 is a side elevational view, enlarged, of the assembled device comprising my invention;

Figure 2 is a sectional elevational view of the device; and,

Fig. 3 is a sectional view taken upon the line 3—3 of Fig. 2.

As shown in the drawings, the device comprising the invention may be made up of a tubular member 10 provided at each end with threaded insulation sleeves 11 and 12, which may be threaded to receive a pair of electrode screws 13 and 14, respectively. A supporting screw 15 may extend transversely of the tube 10 and centrally thereof. This screw may be provided with a pair of nuts 16 and 17 for positioning the tube thereon and may extend through any suitable supporting structure (not shown) and may thus serve to retain the condenser against its mounting.

The insulation threaded sleeves 11 and 12 may be fixed within the end of the tube 10 in any suitable manner as by indenting the tube into the insulation shown at 18.

The electrode screws 13 and 14 may be provided with lock nuts 19 and 20, respectively, which serve to prevent unintended turning of the screws. The electrode screws 13 and 14 also serve a further purpose as binding screws for the terminal connections 21 and 22, respectively, to which the lead wires may be attached for connecting the condenser to the desired external circuit. The terminal connections 21 and 22 may be locked in position upon the electrode screws 13 and 14 and against the nuts 19 and 20 by an additional pair of nuts 23 and 24, respectively.

If desired, the device as shown may be connected in series with any desired circuit as a single condenser, the capacity being between the inwardly protruding ends of the screws 13 and 14. In this case the capacity may be adjusted by turning either of the electrode screws 13 and 14 within the insulation sleeves. It is apparent that a fractional turn of either of the screws will alter the longitudinal position of the screw only by a minute amount, and accordingly the capacity of the device may be thus adjusted very accurately. This adjustment is substantially a micrometer adjustment. The possibility of very accurate adjustment of this condenser renders it especially adapted for use in sharply tuning oscillatory circuits, such as used in connection with vacuum tube oscillators, amplifiers and rectifiers.

In case it is desired to connect this device as a pair of condensers in parallel, the supporting screw 15 may serve as a means for attaching a third lead wire. In this instance the conductive tube 10 serves as a third electrode cooperating with the screw 13 to provide one condenser and with a screw 14 to provide the other condenser. In this case either of the condensers formed may be independently adjusted by turning the screws 13 or 14, as above described.

While but one modification of my invention is herein shown and described, it will be understood that many variations and additions may be made thereto and accordingly I desire to be limited in my protection only as set forth in the appended claims, or as may be required by the prior art.

Having thus described my invention what I now claim as new and desire to secure by Letters Patent of the U. S. is:

1. An electrical condenser comprising a conductive tube forming one electrode, a threaded conductor extending an adjustable distance therein and its threaded portion forming a second electrode, and a threaded insulating support for receiving said threaded conductor.

2. An electrical condenser comprising a conductive tube forming one electrode, an insulated support at one end of said tube, a screw forming a second electrode threaded in said support, said screw extending into said tube for a variable distance adjustable by turning the screw within the support, and means cooperating with the screw for locking said screw when in a desired adjustment.

3. Electrical capacity comprising a fixed tubular electrode, a screw spaced therefrom and forming a second electrode, and a threaded bearing for adjustably retaining said screw in desired positions relative to said fixed electrode.

4. An electrical condenser comprising a plurality of screws forming electrode members, and threaded insulation supporting means for said screws whereby the relative positions thereof may be varied to secure the desired capacity adjustment.

5. An electrical condenser comprising a tubular member, screws mountably extending longitudinally therein and constituting opposed electrodes, the mounting of said screws closing the ends of said tube.

6. A condenser comprising an electrically conductive tubular member forming one electrode, additional electrodes in the form of screws extending inwardly from each end thereof, and insulation bushings threaded to retain the screws and fixed at each end of said tubular member.

7. A condenser comprising an electrically conductive tubular member forming one electrode, additional electrodes in the form of screw members, said members further serving as connecting means for condenser lead wires.

8. A condenser comprising a tubular member forming one electrode, a supporting and terminal screw extending transversely therethru, and an additional electrode member in the form of a screw adjustably mounted and extending longitudinally into an end of said tubular member.

9. An electrical condenser comprising a conductive tube forming an electrode, a supporting terminal at the center thereof, insulation threaded bushings at the ends thereof, screws forming additional electrodes threaded thru said bushings and extending for adjustable distances within said tube.

In witness whereof, I have hereunto subscribed my name.

EDWIN S. TRUE.